United States Patent
Zhang

(10) Patent No.: US 10,411,448 B1
(45) Date of Patent: Sep. 10, 2019

(54) RING ASSEMBLY OF RADIALLY-CONCENTRIC RINGS WITH QUICK FASTENING MECHANISM TO DETACHABLY CONNECT SUCH RINGS TO ONE ANOTHER

(71) Applicant: Siemens Industry, Inc., Alpharetta, GA (US)

(72) Inventor: Fan Zhang, Suwanee, GA (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 0 days.

(21) Appl. No.: 16/105,208

(22) Filed: Aug. 20, 2018

(51) Int. Cl.
H02G 3/08 (2006.01)

(52) U.S. Cl.
CPC .................... H02G 3/083 (2013.01)

(58) Field of Classification Search
None
See application file for complete search history.

(56) References Cited

U.S. PATENT DOCUMENTS

| | | | | |
|---|---|---|---|---|
| 2,355,126 A | * | 8/1944 | Webster | F16L 5/00 16/2.1 |
| 2,663,895 A | * | 12/1953 | Petri | H02G 3/083 16/2.1 |
| 2,684,400 A | * | 7/1954 | Redmond | H02G 3/083 174/153 G |
| 3,001,007 A | * | 9/1961 | Klumpp, Jr. | H02G 3/0616 16/2.1 |
| 3,016,562 A | * | 1/1962 | Reid | F16L 5/00 16/2.1 |
| 3,726,374 A | * | 4/1973 | Warren | F16D 65/121 192/107 R |
| 3,957,087 A | * | 5/1976 | Johnston | D06B 23/025 138/178 |
| 3,999,825 A | * | 12/1976 | Cannon | F16L 23/06 439/192 |
| 4,430,778 A | * | 2/1984 | Sander | A44C 5/2014 24/3.6 |
| 4,808,774 A | * | 2/1989 | Crane | H02G 3/083 174/135 |
| 4,928,202 A | * | 5/1990 | Gale | F16L 19/005 174/47 |
| 5,055,192 A | * | 10/1991 | Artinyan | B01D 29/111 210/346 |
| 5,165,160 A | * | 11/1992 | Poncelet | B23K 37/0533 228/49.3 |

(Continued)

*Primary Examiner* — Dimary S Lopez Cruz
*Assistant Examiner* — Muhammed Azam

(57) ABSTRACT

A ring assembly may include a plurality of radially-concentric rings (18) selectively arrangeable to define an aperture (20) for a conduit fitting connection. A fastening mechanism (22) in each ring of the plurality of radially-concentric rings permits to detachably connect the plurality of radially-concentric rings to one another. The fastening mechanism may be arranged to permit a selectable annular grouping of the plurality of radially-concentric rings in the ring assembly to be detached from a remainder of the radially-concentric rings in the ring assembly located in the opening in the wall. The product may be purveyed as a kit of rings (18) that may be selectively arrangeable to form the ring assembly of radially-concentric rings to define the aperture for the conduit fitting connection.

23 Claims, 4 Drawing Sheets

(56) References Cited

U.S. PATENT DOCUMENTS

| | | | |
|---|---|---|---|
| 5,444,183 A | 8/1995 | Gehrs et al. | |
| 5,628,087 A * | 5/1997 | Gretz | H02G 3/083 16/2.1 |
| 6,062,607 A * | 5/2000 | Bartholomew | F16L 37/084 285/319 |
| 6,073,973 A * | 6/2000 | Boscaljon | F16L 19/005 285/354 |
| 6,234,544 B1 * | 5/2001 | Bartholomew | F16L 37/088 285/319 |
| 6,311,875 B1 * | 11/2001 | Anderson | B67D 1/0832 222/396 |
| 6,845,644 B1 * | 1/2005 | Buckner | A44B 15/00 24/20 EE |
| 7,353,961 B2 | 4/2008 | Hull et al. | |
| 7,706,135 B2 | 4/2010 | Sharp et al. | |
| 8,592,694 B2 | 11/2013 | Bennett et al. | |
| 8,642,885 B2 | 2/2014 | Davila et al. | |
| 9,055,677 B2 | 6/2015 | Garza, Jr. et al. | |
| 9,213,161 B2 * | 12/2015 | Cote | G02B 6/46 |
| 9,506,322 B2 * | 11/2016 | Prosser | E21B 34/14 |
| 9,506,592 B2 * | 11/2016 | Turnau, III | F16L 37/0915 |
| 9,530,449 B1 * | 12/2016 | Dobosz | G11B 19/2045 |
| 9,777,875 B2 * | 10/2017 | Bobo | F16L 37/0915 |
| 9,806,510 B2 * | 10/2017 | Trapassi | H02G 3/0493 |
| 2002/0043368 A1 * | 4/2002 | Bell | E21B 33/1216 166/118 |
| 2004/0035171 A1 * | 2/2004 | Gormany | B23K 7/006 72/125 |
| 2005/0214145 A1 * | 9/2005 | Grinbergs | F04D 17/165 417/423.14 |
| 2006/0090706 A1 * | 5/2006 | Miller | C23C 14/50 118/728 |
| 2006/0231682 A1 * | 10/2006 | Sarh | B29C 70/32 244/119 |
| 2007/0040379 A1 * | 2/2007 | Clark | F16L 33/06 285/321 |
| 2008/0089001 A1 * | 4/2008 | Parkhe | H01L 21/6831 361/234 |
| 2009/0275459 A1 * | 11/2009 | Dietschreit | B04B 7/18 494/36 |
| 2010/0193241 A1 | 8/2010 | Bennett et al. | |
| 2010/0243315 A1 | 9/2010 | Shumate et al. | |
| 2010/0263819 A1 * | 10/2010 | Maurais | B01D 29/445 162/232 |
| 2011/0095068 A1 * | 4/2011 | Patel | A61B 17/115 227/180.1 |
| 2012/0285717 A1 | 11/2012 | Shumate et al. | |
| 2013/0091974 A1 * | 4/2013 | Riwan | B25J 18/06 74/490.04 |
| 2014/0147766 A1 * | 5/2014 | Huynh | H01M 8/2425 429/458 |
| 2014/0241020 A1 * | 8/2014 | Krause | H02K 11/042 363/126 |
| 2015/0136557 A1 * | 5/2015 | Bastel | F16D 41/06 192/42 |
| 2015/0143878 A1 * | 5/2015 | Clevelario | F16L 33/01 73/49.5 |
| 2015/0159792 A1 * | 6/2015 | Bobo | F16L 37/091 285/308 |
| 2015/0216564 A1 * | 8/2015 | Salomone | A61B 17/62 606/56 |
| 2016/0281965 A1 * | 9/2016 | Schneider | F21S 8/022 |
| 2016/0326861 A1 * | 11/2016 | Brower | E21B 47/0006 |
| 2017/0146127 A1 * | 5/2017 | Singh | F16L 15/003 |

\* cited by examiner

RING ASSEMBLY OF RADIALLY-CONCENTRIC RINGS WITH QUICK FASTENING MECHANISM TO DETACHABLY CONNECT SUCH RINGS TO ONE ANOTHER

BACKGROUND

1. Field

The present invention relates generally to the field of electrical enclosures, and, more particularly, to a ring assembly made up of radially-concentric rings that may be selectively arranged to define an aperture having a desired diameter for a conduit fitting connection for an electric apparatus, such as a circuit breaker, that may be contained in the electrical enclosure.

2. Description of the Related Art

Electric apparatuses, such as circuit breakers for branch circuits at sites served by an electric power distribution system, are typically housed in an electrical enclosure that may be part of a panel board, control center or load center. To accommodate a variety of different apparatus layouts, including layouts involving different sizes, numbers and arrangements of electrical conduits that pass through the enclosure, the electrical enclosures may have one or more "knockout" plates on bottom, top, back, and side walls of the enclosure.

In certain prior art enclosures, the knockout plate may be affixed to the enclosure by way of contact points, such as involving metal webs, so that the knockout plate may be removed from the enclosure, such as by twisting back and forth the metal webs connecting the knockout plate to the enclosure so that such metal webs can be broken, then the knockout panel may be separated from the rest of the enclosure. One disadvantage of this approach is that once such metal webs have been broken, the knockout panel cannot be reattached to the enclosure.

U.S. patent application publication number 2010/0243315 discloses a removable knockout plate that can be made up of several different sized knockout rings forming a cluster of rings. In this arrangement, the knockout rings may need to be sequentially removed one by one from an inner ring toward an outer ring of tihe cluster of rings to reduce the possibility of damaging ring elements that remain in the knockout plate. Like the foregoing approach, once a ring element is removed from tihe cluster of rings, such ring element can no longer be reattached to the cluster of rings. Additionally, this process of removing ring elements one by one can be substantially time consuming and burdensome. At least in view of the foregoing considerations, there is a need for further improvements in electrical panels or enclosures, such as structures for flexibly accommodating conduit fitting connections, as involving different sizes, numbers and arrangements of electrical conduits that pass through the enclosure.

BRIEF DESCRIPTION

A disclosed embodiment is directed to a product including an electrical enclosure having a wall, and at least one opening in the wall. A ring assembly may be located in the opening in the wall. The ring assembly including a plurality of radially-concentric rings selectively arrangeable to define an aperture for a conduit fitting connection. A fastening mechanism in each ring of the plurality of radially-concentric rings to detachably connect the plurality of radially-concentric rings to one another. The fastening mechanism may be arranged to permit a selectable annular grouping of the plurality of radially-concentric rings in the ring assembly to be detached from a remainder of the radially-concentric rings in the ring assembly located in the opening in the wall.

A further disclosed embodiment is directed to a product including a kit including a plurality of rings selectively arrangeable to form a ring assembly of radially-concentric rings to define an aperture for a conduit fitting connection. Each ring of the plurality rings includes a fastening mechanism arranged to detachably connect a selectable annular grouping of the plurality of rings to form the ring assembly of radially-concentric rings that defines the aperture for the conduit fitting connection. A desired diameter of the aperture for the conduit fitting connection is selectable based on the diameter of an aperture of a radially inner-most ring in the ring assembly.

DETAILED DESCRIPTION

Disclosed embodiments may provide a ring assembly of radially-concentric rings that may be used in an electrical panel or enclosure to flexibly accommodate conduit fitting connections, such as incoming or outgoing wire conduits that pass through the enclosure. Disclosed embodiments are effective to quickly select with a minimal effort a conduit aperture of a desired diameter to fit installation requirements in a cost effective and reliable manner. It is expected that disclosed embodiments will substantially reduce the magnitude of wiring time typically involved in installations involving prior art knock out plates. For example, the ability to detachably connect selectable annular groupings of the plurality of radially-concentric rings in a quick and user-friendly manner can provide substantial flexibility to an operator or installer to select the desired diameter of the aperture for the conduit fitting connection.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

Figure 1:
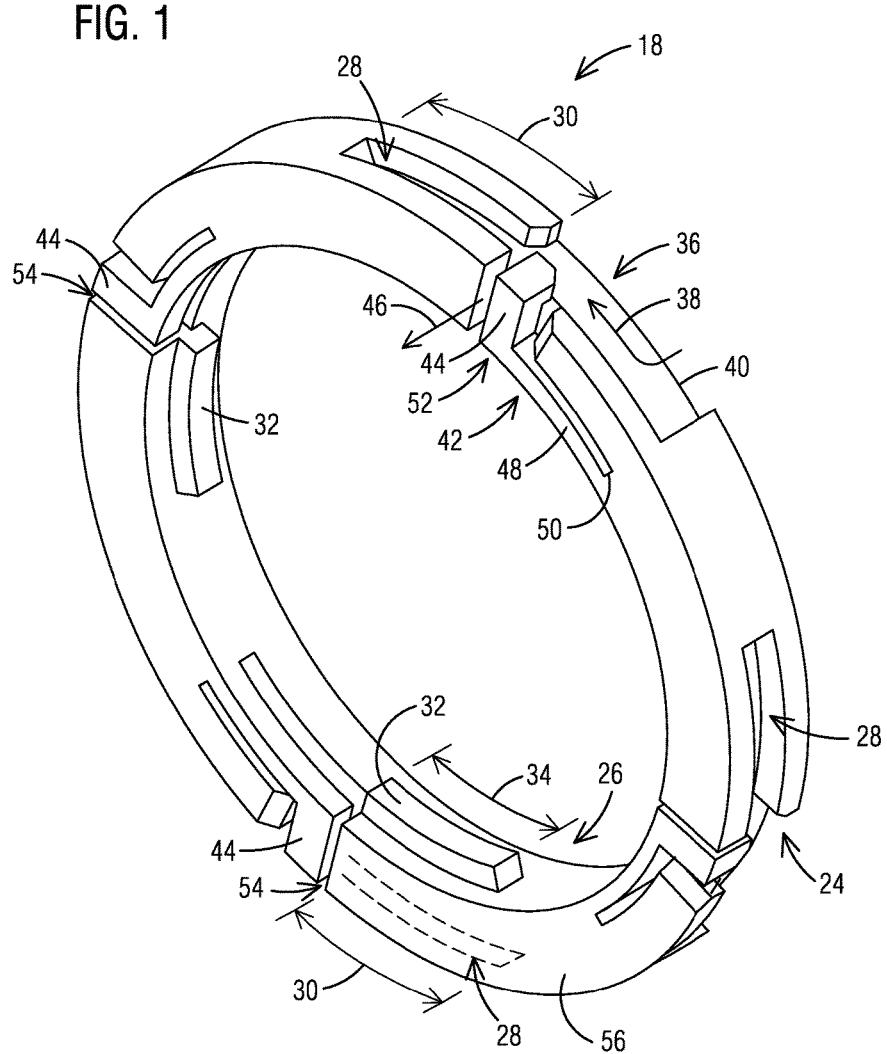
FIG. 1 is an isometric view of one non-limiting embodiment of a disclosed ring.
Figure 2:
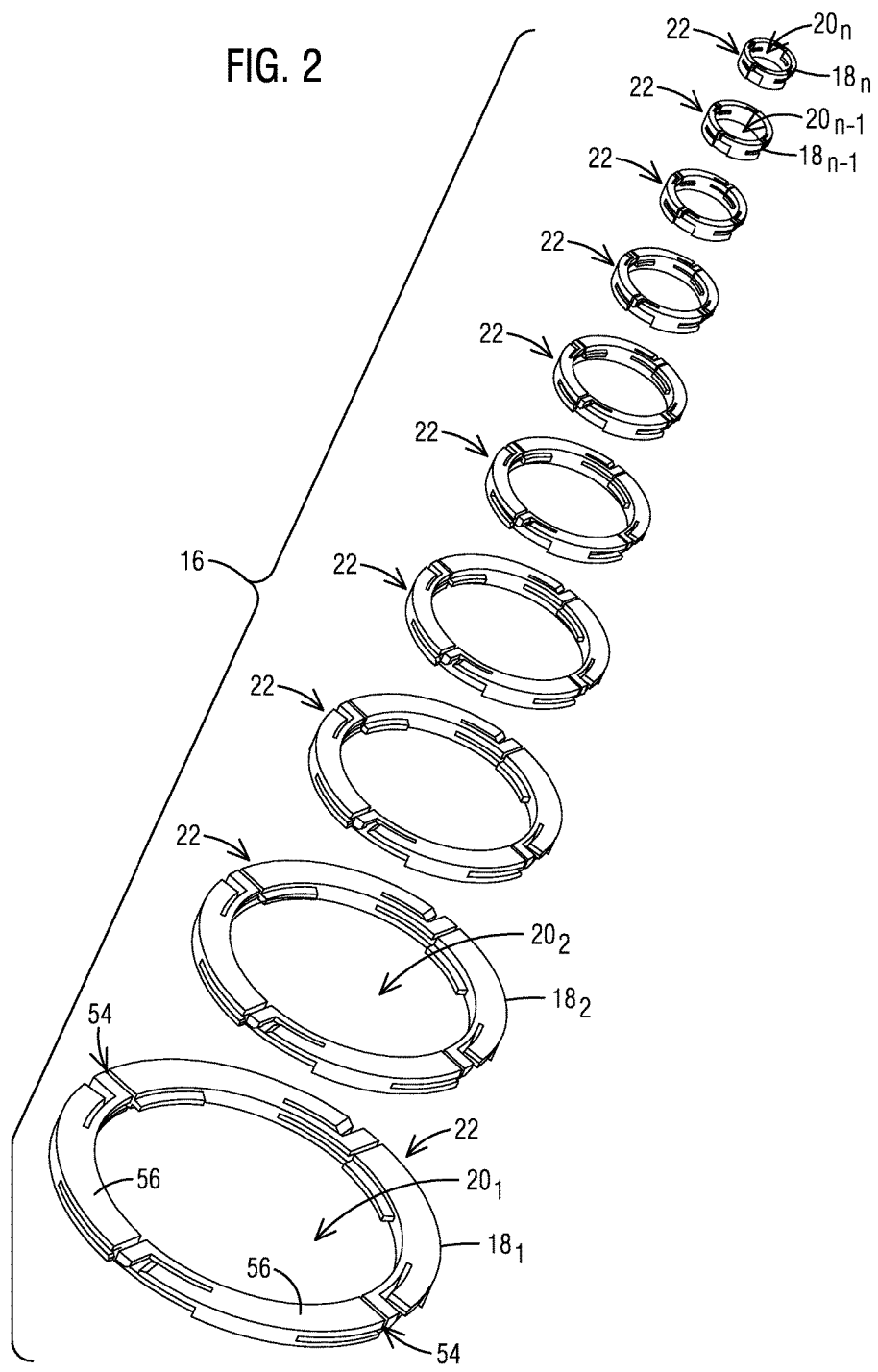
FIG. 2 is an exploded view of a plurality of disclosed rings that may be arranged to form a disclosed ring assembly of radially-concentric rings.
Figure 3:
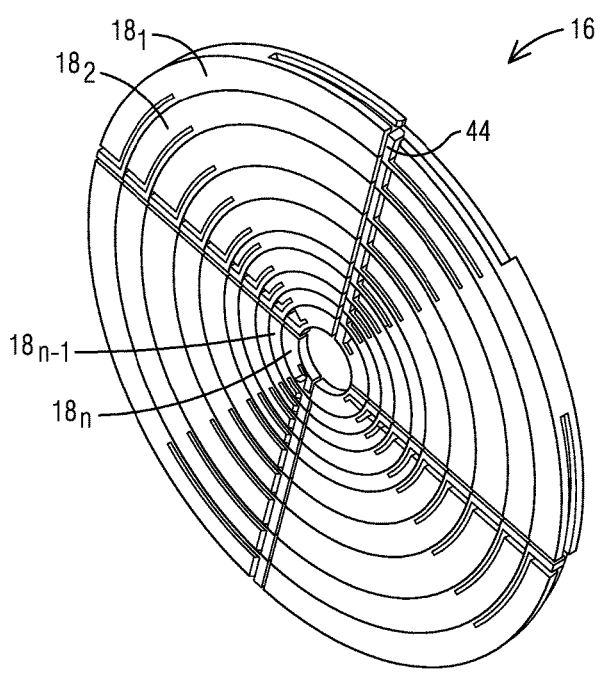
FIG. 3 is an isometric view of a ring assembly that may be formed with the plurality of disclosed rings shown in FIG. 2.
Figure 6:
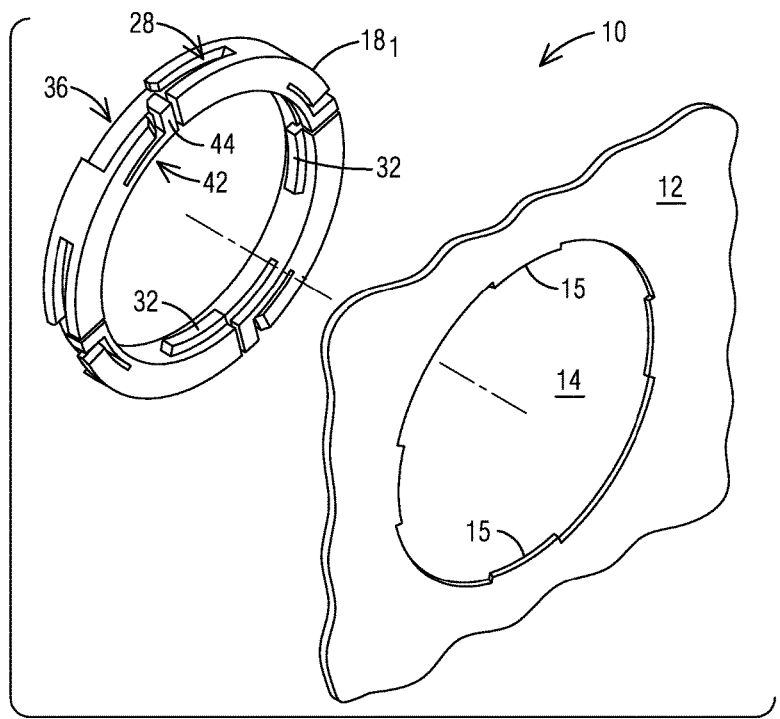
FIG. 6 is an exploded view of one disclosed ring and a fragmentarily shown electrical enclosure, where the disclosed ring (or ring assembly of such rings) may be located.

FIG. 1 is an isometric view of one non-limiting embodiment of a disclosed ring 18. This structure constitutes a building block of a ring assembly 16 that may be made up of a plurality of suitable sized rings 18 (FIGS. 2 and 3). Without limitation, ring assembly 16 may be located in an electrical enclosure 10 (FIG. 6) including a wall 12, and at least one opening 14 in the wall.

As may be better appreciated in FIG. 3, ring assembly 16 may be formed by a plurality of radially-concentric rings, such as radially-concentric rings $18_1$ through $18n$. Each of such rings defines a respective aperture $20_1$ through $20_n$ that may be selected for a conduit fitting connection. The plurality of radially-concentric rings 18 is selectively arrangeable to define the aperture for the conduit fitting connection. It should be appreciated that the specific number of rings and/or the size of such rings, as illustrated in the figures, should be construed in exemplary sense and not in a limiting sense being that such features may be readily tailored based on the needs of a given application.

As described in greater detail below, a fastening mechanism 22 (FIG. 2) is included in each ring 18 of the plurality of radially-concentric rings to detachably connect the plurality of radially-concentric rings to one another.

For the sake of conceptual explanation, let us presume electrical enclosure 10 includes ring assembly 16, as shown in FIG. 3, when delivered to the installer. In this exemplary case, fastening mechanism 22 may be arranged to permit a selectable annular grouping of the plurality of radially-concentric rings (for example, radially-concentric rings $18_3$ (not explicitly labeled) through $18_n$) in ring assembly 16 to be detached from a remainder (in this example, radially-concentric rings $18_1$ through $18_2$) of the radially-concentric rings in the ring assembly located in opening 14 (FIG. 6) in the wall 12.

In this example, a desired diameter of the aperture for the conduit fitting connection is selectable based on the diameter of the aperture of a radially-innermost ring in the remainder of the radially-concentric rings in the ring assembly. In this example, the desired diameter of the aperture for the conduit fitting connection would be the diameter of aperture $20_2$, which is the radially, inner-most ring in the remainder of the radially-concentric rings $18_1$ and $18_2$.

For the sake of further conceptual explanation, let us alternatively presume a kit of unassembled rings $18_1$ through $18_n$, such as shown in FIG. 2, is delivered to the installer. Further presuming the desired diameter of the aperture for the conduit fitting connection is the same as above, then in this case radially-concentric rings $18_1$ and $18_2$ would be detachably connected onto opening 14 in wall 12 of electrical enclosure 10 to meet the desired diameter of the aperture for the conduit fitting.

In general, in this case, the kit of rings $18_1$ through $18_n$ may be selectively arrangeable to form a ring assembly 16 of radially-concentric rings to define the aperture for a conduit fitting connection. Fastening mechanism 22 is arranged to detachably connect a selectable annular grouping of the plurality of rings (in this example, rings $18_1$ and $18_2$) to form the ring assembly of radially-concentric rings that defines the desired aperture for the conduit fitting connection. Thus, regardless of whether one starts with an assembled ring assembly or with a kit of rings, the desired diameter of the aperture for the conduit fitting connection may be selectable based on the diameter of an aperture of a radially inner-most ring in the ring assembly.

It should be appreciated that the installer, in one quick ring disconnect (or connect) action, has the flexibility of selecting an aperture having any desired diameter for the conduit fitting connection. That is, any desired diameter available from aperture $20_1$ through aperture $20_n$. It should be further appreciated that the installer could rearrange the ring assembly to another desired diameter for the conduit fitting connection. Continuing with the foregoing example, if the installer, in lieu of the diameter of aperture $20_2$, for a future application desired the diameter of aperture $20_5$ for a new conduit fitting connection, then the installer could just add radially-concentric rings $18_3$ through $18_5$ (shown but not expressly labelled in the figures) onto radially concentric ring $18_2$.

As may be appreciated in FIG. 1, the fastening mechanism in each ring includes an outer diameter fastening portion 24 and an inner diameter fastening portion 26. With reference to FIGS. 2 and 3, the outer diameter fastening portion of a given ring (e.g., ring $18_2$) of the plurality of radially-concentric rings is configured to engage the inner diameter fastening portion of a next radially outwardly adjacent ring (e.g., ring $18_1$) of the plurality of radially-concentric rings.

Returning to FIG. 1, the outer diameter fastening portion 24 in each ring 18 of the plurality of radially-concentric rings is configured to define a plurality of circumferentially distributed slots 28, such as, without limitation, four slots. Each slot extends over a respective arc segment 30 (such as, without limitation, spanning approximately 30°) in the outer diameter fastening portion.

The inner diameter fastening portion 26 in each ring 18 of the plurality of radially-concentric rings includes a plurality of circumferentially distributed ribs 32 such as, without limitation, four ribs. Each rib 32 may be a radially-protruding rib that extends over a respective arc segment 34 (such as, without limitation, spanning approximately 30°) in the inner diameter fastening portion. In one non-limiting embodiment, the arc segments 34 in the inner diameter fastening portion 26 may be in substantial correspondence with the arc segments 30 in the outer diameter fastening portion 24, as schematically conceptualized by the hidden lines for one of the slots 28 not visible in FIG. 1.

It will be appreciated that the slots 28 in the outer diameter fastening portion 24 of the radially, outer-most ring of the ring assembly (e.g., in this case radially concentric ring $18_1$) would engage circumferentially distributed ribs 15 (FIG. 6) constructed in opening 14 (FIG. 6) in the wall 12 of electrical enclosure 10. It will be appreciated that this feature applies to any of the rings 18 that may be configured to fit in other openings (not shown in FIG. 6) in the wall 12 of electrical enclosure 10. That is, a ring having a diameter configured to correspond with the diameter of one of such other openings.

Returning to FIG. 1, the outer diameter fastening portion 24 in each ring 18 of the plurality of radially-concentric rings is further configured to define a plurality of circumferentially distributed cutoffs 36, e.g., a number equal to the number of slots 28. Each cutoff 36 defines an access path (schematically represented by arrow 38 in FIG. 1) leading to a slot 28 of the plurality of circumferentially distributed slots. The access path 38 is arranged to permit access to a rib (e.g., a rib in the inner diameter fastening portion 26 of ring $18_1$) into the slot (e.g., a slot 24 located in the outer diameter fastening portion 26 of ring $18_2$). Without limitation, each cutoff 36 may be accessible from a first face 40 (e.g., a rear face) of each ring 18. First face 40 may be opposite a second face 56 (e.g., a front face) of the plurality of radially-concentric rings.

The fastening mechanism 22 in ring 18 further comprises a plurality of circumferentially distributed spring-biased clips 42 (e.g., the number of spring-biased clips should be equal to the number of slots and ribs) for detachably locking the outer diameter fastening portion 24 of the given ring (e.g., ring $18_2$) of the plurality of radially-concentric rings to the inner diameter fastening portion 26 of the next outwardly adjacent ring (e.g., ring $18_1$) of the plurality of radially-concentric rings.

As may be appreciated in FIG. 1, each of the plurality of circumferentially distributed spring-biased clips 42 includes a tab 44 arranged at an entrance of a slot 28 of the plurality of circumferentially distributed slots 28 (e.g., a slot in the outer diameter fastening portion 24 of ring $18_1$). Tab 44 is deflectable (schematically represented by arrow 46 in FIG. 1) from an unbiased position to a biased position in response to interference with a rib of the plurality of circumferentially distributed ribs (e.g., a rib in the inner diameter fastening portion 26 of ring $18_1$) as the rib is inserted into slot 28. When the rib has been inserted into the slot, the tab freely returns to the unbiased position, which is arranged to lock the rib in the slot. In certain embodiments, tab 44 may be deflectable from the unbiased position to the biased position in response to manipulation to unlock the rib in the slot and permit removal of the rib from the slot. In certain alternative embodiments, tab 44 may be broken off, biased out of the way or otherwise removed to unlock the rib in the slot and remove the rib from the slot.

As may be further appreciated in FIG. 1, each of the spring-biased clips 42 includes a biasing element 48 that may be integrally constructed in each respective ring 18 of the plurality of radially-concentric rings. Biasing element 48 may be arranged to circumferentially extend between an anchor end 50 of biasing element 48 that may be rooted in the inner diameter fastening portion 26 and a free end 52 of the biasing element 48. Tab 44 is positioned at the free end 52 of the of the biasing element and extends radially towards the outer diameter fastening portion 24. In one non-limiting embodiment, biasing element 48 may be conceptualized to form a generally L-shape structure, where the tab 44 corresponds to the short segment of the L and the biasing element 48 generally corresponds to the relatively longer segment of the L. Tab 44, positioned at the free end of the biasing element in each of the spring-biased clips, defines a gap 54 (FIGS. 1 and 2) in forward face 56 of each ring 18 of the plurality of radially-concentric rings.

Figure 4:
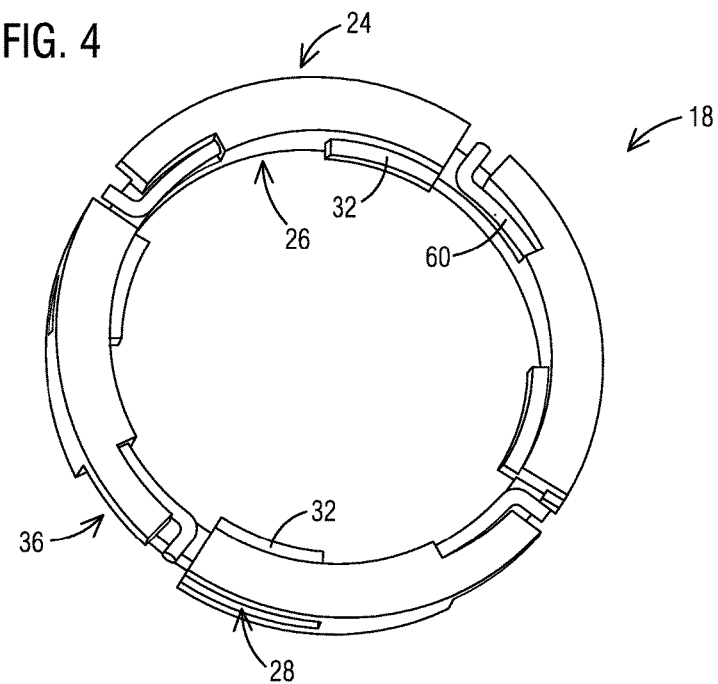
FIG. 4 is a side view of a disclosed ring illustrating one embodiment of a spring-biased clip that may be integrally formed in the disclosed ring.
Figure 5:
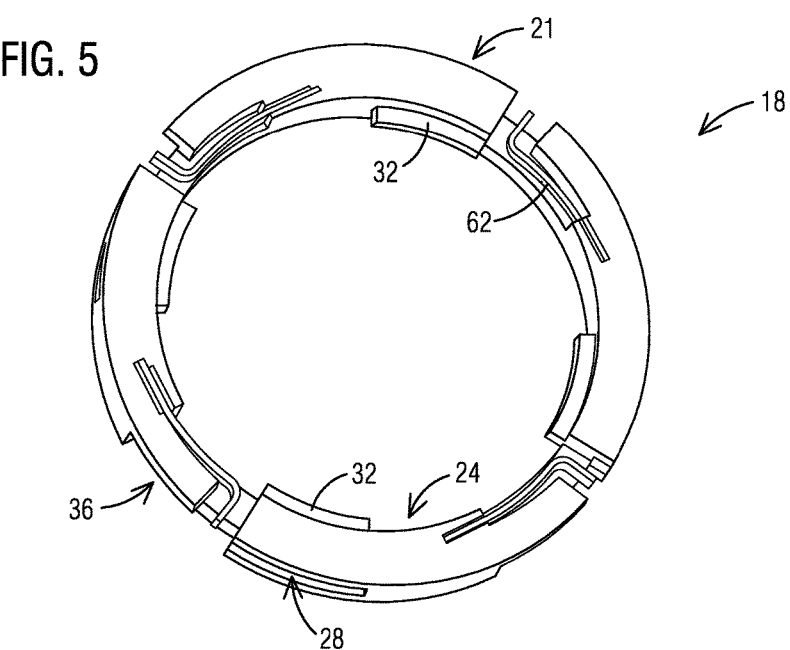
FIG. 5 is a side view of a disclosed ring illustrating another embodiment of the spring-biased clip.

As may be appreciated in FIG. 4, the biasing element may be formed by a rounded body 60, (such as having a tubular or wire form). Alternatively, the biasing element may be formed by a flat body 62, as may be appreciated in FIG. 5).

Without limitation, a material for making the plurality of radially-concentric rings 18 may be selected from the group consisting of a metallic material, a plastic material, a fiberglass material, a rubber material, and a composite material.

From the foregoing disclosure, it should be appreciated that disclosed embodiments provide a ring assembly of radially-concentric rings that may be used in an electrical panel or enclosure to flexibly, quickly and reliably accommodate conduit fitting connections. Disclosed embodiments are effective to quickly select with a minimal effort a conduit aperture of a desired diameter to fit installation requirements in a cost effective and reliable manner. It is expected that disclosed embodiments will substantially reduce the magnitude of wiring time typically involved in installations involving prior art knock out plates.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A product comprising:
   an electrical enclosure comprising a wall, and at least one opening in the wall;
   a ring assembly located in said at least one opening in the wall, the ring assembly comprising a plurality of radially-concentric rings selectively arrangeable to define an aperture for a conduit fitting connection; and
   a fastening mechanism in each ring of the plurality of radially-concentric rings to detachably connect the plurality of radially-concentric rings to one another,
   wherein the fastening mechanism is arranged to permit a selectable annular grouping of the plurality of radially-concentric rings in the ring assembly to be detached from a remainder of the radially-concentric rings in the ring assembly located in said at least one opening in the wall.

2. The product of claim 1, wherein a desired diameter of the aperture for the conduit fitting connection is selectable based on the diameter of an aperture of a radially inner-most ring in the remainder of the radially-concentric rings in the ring assembly.

3. The product of claim 1, wherein the fastening mechanism in each ring of the plurality of radially-concentric rings comprises an outer diameter fastening portion and an inner diameter fastening portion,
   wherein the outer diameter fastening portion of a given ring of the plurality of radially-concentric rings is configured to engage the inner diameter fastening portion of a next outwardly adjacent ring of the plurality of radially-concentric rings.

4. The product of claim 3, wherein the outer diameter fastening portion in each ring of the plurality of radially-concentric rings is configured to define a plurality of circumferentially distributed slots, each slot extending over a respective arc segment in the outer diameter fastening portion.

5. The product of claim 4, wherein the inner diameter fastening portion in each ring of the plurality of radially-concentric rings includes a plurality of circumferentially distributed ribs, each rib comprising a radially-protruding rib extending over a respective arc segment in the inner diameter fastening portion, respective arc segments in the inner diameter fastening portion being in correspondence with respective arc segments in the outer diameter fastening portion.

6. The product of claim 3, wherein the outer diameter fastening portion in each ring of the plurality of radially-concentric rings is further configured to define a plurality of circumferentially distributed cutoffs, each cutoff of the plurality of circumferentially distributed cutoffs defining an access path leading to a slot of the plurality of circumferentially distributed slots,
  wherein the inner diameter fastening portion in each ring of the plurality of radially-concentric rings includes a plurality of circumferentially distributed ribs,
  wherein the access path is arranged to permit access to a rib of the plurality of circumferentially distributed ribs into the slot,
  wherein the slot is located in the outer diameter fastening portion of the given ring of the plurality of radially-concentric rings, and the rib is located in the inner diameter fastening portion of the next outwardly adjacent ring of the plurality of radially-concentric rings.

7. The product of claim 6, wherein the access path defined by each cutoff of the plurality of circumferentially distributed cutoffs is accessible from a first face of each ring of the plurality of radially-concentric rings.

8. The product of claim 3, wherein the fastening mechanism in each respective ring of the plurality of radially-concentric rings further comprises a plurality of circumferentially distributed spring-biased clips for detachably locking the outer diameter fastening portion of the given ring of the plurality of radially-concentric rings to the inner diameter fastening portion of the next outwardly adjacent ring of the plurality of radially-concentric rings.

9. The product of claim 8, wherein the outer diameter fastening portion in each ring of the plurality of radially-concentric rings is configured to define a plurality of circumferentially distributed slots, wherein the inner diameter fastening portion in each ring of the plurality of radially-concentric rings includes a plurality of circumferentially distributed ribs, wherein each of the plurality of circumferentially distributed spring-biased clips includes a tab arranged at an entrance of a slot of the plurality of circumferentially distributed slots,
  wherein the tab is deflectable from an unbiased position to a biased position in response to interference with a rib of the plurality of circumferentially distributed ribs as the rib is inserted into the slot of the plurality of circumferentially distributed slots,
  wherein, when the rib has been inserted into the slot, the tab freely returns to the unbiased position, which is arranged to lock the rib in the slot.

10. The product of claim 9, wherein the tab is deflectable from the unbiased position to the biased position in response to manipulation to unlock the rib in the slot and permit removal of the rib from the slot.

11. The product of claim 9, wherein each of the spring-biased clips comprises a biasing element integrally constructed in each respective ring of the plurality of radially-concentric rings.

12. The product of claim 11, wherein the biasing element is arranged to circumferentially extend between an anchor end of the biasing element rooted in the inner diameter fastening portion and a free end of the biasing element.

13. The product of claim 12, wherein the tab is positioned at the free end of the biasing element and extends radially towards the outer diameter fastening portion.

14. The product of claim 13, wherein the tab positioned at the free end of the biasing element in each of the spring-biased clips defines a gap in a second face of each ring of the plurality of radially-concentric rings.

15. The product of claim 11, wherein the biasing element comprises a rounded cross-sectional profile.

16. The product of claim 11, wherein the biasing element comprises a flat cross-sectional profile.

17. The product of claim 1, wherein a material for the plurality of radially-concentric rings is selected from a group consisting of a metallic material, a plastic material, a fiberglass material, a rubber material, and a composite material.

18. A product comprising:
  a kit comprising a plurality of rings selectively arrangeable to form a ring assembly of radially-concentric rings to define an aperture for a conduit fitting connection,
  wherein each ring of the plurality rings includes a fastening mechanism arranged to detachably connect a selectable annular grouping of the plurality of rings to form the ring assembly of radially-concentric rings that defines the aperture for the conduit fitting connection,
  wherein a desired diameter of the aperture for the conduit fitting connection is selectable based on a diameter of an aperture of a radially inner-most ring in the ring assembly.

19. The product of claim 18, wherein the ring assembly is located in an opening in a wall of an electric enclosure.

20. The product of claim 18, wherein the fastening mechanism in each ring of the plurality rings comprises an outer diameter fastening portion and an inner diameter fastening portion,
  wherein the outer diameter fastening portion of a given ring of the plurality of radially-concentric rings is configured to engage the inner diameter fastening portion of a next outwardly adjacent ring of the plurality of radially-concentric rings.

21. The product of claim 20, wherein the outer diameter fastening portion in each ring of the plurality of radially-concentric rings is configured to define a plurality of circumferentially distributed slots, each slot extending over a respective arc segment in the outer diameter fastening portion.

22. The product of claim 21, wherein the inner diameter fastening portion in each ring of the plurality of radially-concentric rings includes a plurality of circumferentially distributed ribs, each rib comprising a radially-protruding rib extending over a respective arc segment in the inner diameter fastening portion, respective arc segments in the inner diameter fastening portion being in correspondence with respective arc segments in the outer diameter fastening portion.

23. The product of claim 22, wherein the outer diameter fastening portion in each ring of the plurality of radially-concentric rings is further configured to define a plurality of circumferentially distributed cutoffs, each cutoff of the plurality of circumferentially distributed cutoffs defining an access path leading to a slot of the plurality of circumferentially distributed slots,
  wherein the access path is arranged to permit access to a rib of the plurality of circumferentially distributed ribs into the slot,
  wherein the slot is located in the outer diameter fastening portion of the given ring of the plurality of radially-concentric rings, and the rib is located in the inner diameter fastening portion of the next outwardly adjacent ring of the plurality of radially-concentric rings.

* * * * *